United States Patent Office 3,398,026
Patented Aug. 20, 1968

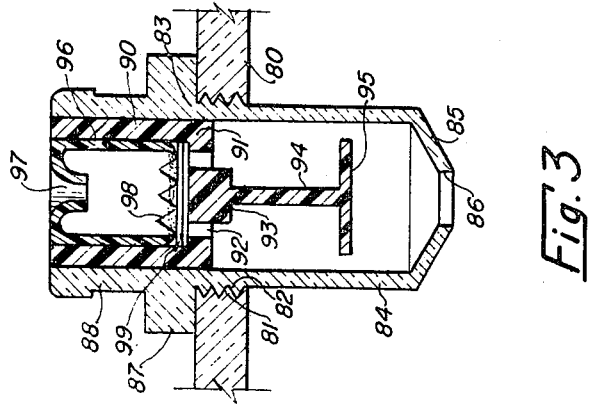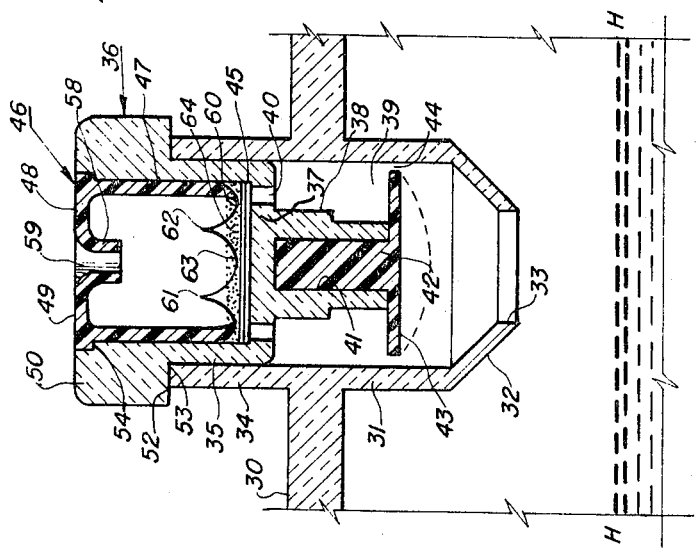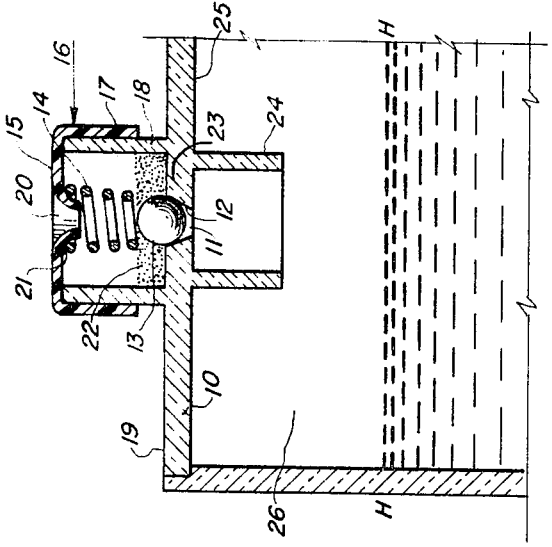

3,398,026
**ELECTROCHEMICAL CELL INCORPORATING
A UNIDIRECTIONAL VALVE**
Henri Georges André, Montmorency, France, assignor to
Yardney International Corporation, New York, N.Y.,
a corporation of New York
Continuation of application Ser. No. 291,695, July 1,
1963. This application Aug. 1, 1966, Ser. No. 569,536
Claims priority, application France, July 3, 1962,
902,812
7 Claims. (Cl. 136—178)

ABSTRACT OF THE DISCLOSURE

A valve is disclosed which is particularly suited for incorporation in a rechargeable or storage cell and which provides for the unidirectional passage of gas between regions having a gas pressure differential thereacross. The valve comprises a partition means interposed between the regions of high and low pressure and having at least one aperture therein. A layer of viscous medium i.e., a high vacuum grease is applied along the partition means, at least along the side thereof exposed to the low pressure medium. The partition means normally blocks the aperture but is displaceable therefrom upon an increase in the pressure in the high pressure region above a predetermined level, permitting gas to pass from the high pressure region to the low pressure region. The viscous grease is selected so that it will have a sufficient surface tension and shape retentiveness to reform a film on the partition means serving to again block the aperture.

---

This application is a continuation of patent application, Ser. No. 291,695, filed July 1, 1963, which is now abandoned.

My present invention relates to venting valves for electrochemical accumulators and, in general, for the unidirectional passage of gas between a high-pressure region and a low-pressure region on opposite sides of such a valve.

It is well known that electrochemical devices, utilizing at least one pair of electrodes and an electrolyte in which the electrodes are immersed, frequently evolve gases upon the input of an electric current to the system. Thus, when the system constitutes a rechargeable storage cell having a liquid-tight cell casing in which the electrodes and the electrolyte are disposed, vents may be provided to discharge the gases arising from even slight overcharging of the electrodes or the exceeding of the hydrogen or oxygen overvoltages at the respective electrodes. Since it is desirable, especially for aerospace applications, to ensure that the electrolyte will not be discharged from the cell when the latter is inverted or otherwise displaced from a normally upright position, it has been the practice to hermetically seal the cells or to provide meandering vents through which the liquid has difficulty in escaping but which nevertheless freely pass the gases. In the case of earlier hermetically sealed cell casings, especially intricate precautions must be taken to prevent evolution of gases upon overcharging, as previously mentioned, since such evolution rapidly increased the pressure within the cell casing and tended to strain the latter until the bursting force was reached, whereupon the casing ruptured to discharge electrolyte and render the unit totally unusable. In systems provided with meandering vents another disadvantage came into play; particularly when the cell was provided with an alkaline electrolyte, contact of atmospheric gases, entering through the vent into the cell casing, with the electrolyte resulted in carbonization of the latter and a rapid loss in the effectiveness of the cell. This is especially disadvantageous in alkaline accumulators operating with silver/silver-oxide positive electrodes and either zinc/zinc-oxide or cadmium/cadmium-oxide negative electrodes, the present invention being particularly applicable to these systems.

It has also been proposed to provide nonsealed cells of this general type with conventional unidirectional venting valves having a valve seat and a valve body normally lodged against this seat. With such valves, however, a further disadvantage is noted. Since the gases evolved from the electrode tend to carry with them particles or droplets thereof, the valve seat and/or the valve body readily is coated with a film of electrolyte which, in contact with the atmosphere, results in the formation of carbonate crystals which maintain the valve in its open condition and permit carbonization of the electrolyte within the cell by carbon dioxide present in the atmosphere. For this reason earlier vent valves have found only limited practical application and had only limited durability.

It is the principal object of the present invention, therefore, to provide an improved valve which permits the unidirectional passage of gases between regions having a gas pressure thereacross but which is adapted to obviate the aforementioned disadvantages.

Another object of my invention is to provide a valve of this character which is particularly suited for incorporation in a rechargeable or storage cell and which will have little tendency to be influenced by carbonization.

Still another object of this invention is to provide an improved storage cell incorporating a valve of this type.

A further object of the instant invention is to provide a method of operating a storage cell wherein the danger of deterioration of the latter as a consequence of gas evolution can be reduced if not entirely eliminated.

These objects and others which will become apparent hereinafter are attained, in accordance with the present invention, by providing a valve for the unidirectional passage of gas, between regions having a gas-pressure differential thereacross, which comprises a partition interposed between the regions of high and low pressure and having at least one aperture therein while a layer of a viscous but fluent medium is disposed along the partition at least along the side thereof exposed to the low-pressure region and normally blocks this aperture but is displaceable therefrom upon an increase in the pressure in the high-pressure region above a predetermined level to pass gas from the high-pressure region to the low-pressure region, said medium having sufficient surface tension and shape retentiveness to reform a film blocking the aperture upon passage of the gas.

According to an essential feature of the present invention, the viscous medium is a high-vacuum grease selected from greases containing fluorine and/or silicon and having a viscosity which is, in the main, substantially unaffected by temperature. Such greases may be of the class generally designated fluochloroalkenes or alkanes (such as KEL–F 90 and Voltalef 90) or of the organo-siloxane family (such as that marketed under the name of Rhodosil or Dow Corning Silicone Grease). The present invention makes use of several important properties of greases of this type. Firstly, such greases are readily adherent to the members constituting the valve, namely the aforementioned partition and any member cooperating therewith, but have little tendency to absorb or entrap gases so that they readily reform a continuous film blocking the aperture upon reduction of the pressure differential. Secondly, they have surface tensions sufficiently high to limit passage of the gas when the pressure differential is relatively low so that a predetermined pressure level, somewhat above the ambient atmospheric pressure, can be maintained in the high-pressure region within, say, the interior of a cell casing. The maintenance of a slight gas pressure within the cell greatly improves the functioning of systems employing semipermeable (e.g. cellulosic) membranes between electrodes of opposite polarity as is well known, such systems requiring a continuous pressure upon the electrode separator pack for effective operation.

Moreover, these greases tend to maintain the shape and continuity of the film even after passage of the gas, and thus have a certain resiliency which enables them to block the vent aperture in a very short time after passage of the gas. Still another attribute of the greases is that, when disposed upon a porous layer, they require a pressure differential for the passage of the gas which increases proportionally to the thickness of the grease layer. It is thus possible to control the threshold value for passage of the gas by regulating the thickness of this layer.

Additionally, it may be noted that both the organosiloxane and the fluochloroalkene greases are essentially inert to attack by alkalis and acids normally employed as electrolytes in storage cells. Another advantage of, particularly, the organosiloxanes or silicone greases is that they have a substantially constant viscosity at a temperature ranging between −40° C. and +80° C. the temperature range at which most alkaline storage cells are required to operate, have a low vapor pressure within this range and have little tendency to solidify or precipitate constituents of the grease.

According to a further feature of this invention, the aperture bridged by the silicone or fluorinated (i.e. fluorine-containing) grease is formed between a valve seat in a wall forming part of the partition means and a valve body normally biased into engagement with the seat. More particularly, this valve body can be convex in the direction of an aperture about which the wall forms the annular seat and can cooperate with spring means adapted to urge this body against the seat, a layer of the grease coating the wall and at least partly surrounding the body so as to form a film between it and the seat. The valve body can, however, be constituted as a displaceable flap of a resilient membrane overlying the apertured partition means, the resilient means urging this flap into engagement therewith being the elastic parts of the membrane.

I have discovered that exceptionally good results can be obtained when the partition means includes at least one layer of a fibrous sheet material which is impregnated with the grease and upon which an additional film of the latter may be deposited. The partition means can, in this case, further include an apertured wall through which the gas passes prior to penetrating the interstices of the sheet material, thereby temporarily forcing the viscous medium out of the path of the gas, this medium rapidly reforming a film blocking the apertures constituted by the interstitial passages in the sheet material. It will be apparent that the threshold pressure for the release of gas from the high-pressure region can be varied selectively by altering the thickness of the grease layer superimposed on the apertured wall or the number of such layers. The layer may extend parallel to this wall in a plane or, according to a more specific feature of the invention, may be a coil or reel of sheet material impregnated or coated with the grease. I have discovered that best results are obtained when the sheet material is a porous paper such as a conventional filter paper.

Advantageously, the valve is formed with a tubular depending member projecting inwardly into the casing and having an inlet opening remote from the wall portion thereof in which the valve is provided, this inlet opening lying substantially in a plane transverse to the elongated member and parallel to the casing wall portion but sufficiently distal therefrom that at least a major part of the free volume of electrolyte in the cell can be accommodated between this plane and the wall portion of the casing upon inversion of the latter. The wall provided with the valve seat for carrying the aforementioned sheet material can have an annular array of apertures within this tubular member, a baffle plate preferably being provided therein for accumulating droplets of electrolyte entrained by the gases for returning them to the liquid body within the casing. This baffle plate advantageously extends parallel to the apertured wall but is spaced therefrom and is disposed intermediate this wall and the inlet opening while having a diameter in excess of the diameter of the latter. The valve can also be provided with a second tubular member extending outwardly from the apertured wall for enclosing the sheet material and/or the valve body. An annular retaining element, having a passage open to the atmosphere, may be employed to hold the sheet material or valve body in place, this element preferably being provided with formations engaging the sheet material at peripherally spaced locations so that, at the intervening locations, the sheet material can be displaced slightly by excessive gas pressure to function as a quick-release valve independently of the passage of gas through the interstices of the sheet material.

According to another aspect of this invention, the valve is employed in a silver-zinc storage cell having an alkaline electrolyte. Thus the positive electrode may be a silver/silver-oxide plate while the negative electrode is a zinc/zinc-oxide plate. Interestingly enough, I have observed that it is possible substantially to eliminate gas evolution upon overcharging of such a cell when the negative electrode is provided with an excess of active material above that constituting the electrochemical equivalent of the active material of the positive electrode if the overcharging is carried out at a sufficiently low rate to permit the oxygen discharged at the positive electrode to combine with nascent hydrogen at the negative electrode within the body of electrolyte. Under these circumstances it is possible to hermetically seal the cell and utilize the valve only as a precautionary measure in the event that the charging rate should accidentally exceed the low overcharging level referred to above.

The foregoing and other objects, features and advantages of the present invention will become more readily apparent from the following description, reference being made to the appended drawing in which:

FIG. 1 is an axial cross-sectional view through a valve, according to my invention, built into a cell casing and having a valve body engaging a valve seat;

FIG. 2 is an axial cross-sectional view through another valve according to this invention;

FIG. 3 is an axial cross-sectional view of a modified unidirectional vent valve, embodying the invention, removably maintainable in a cell casing;

Figure 4:
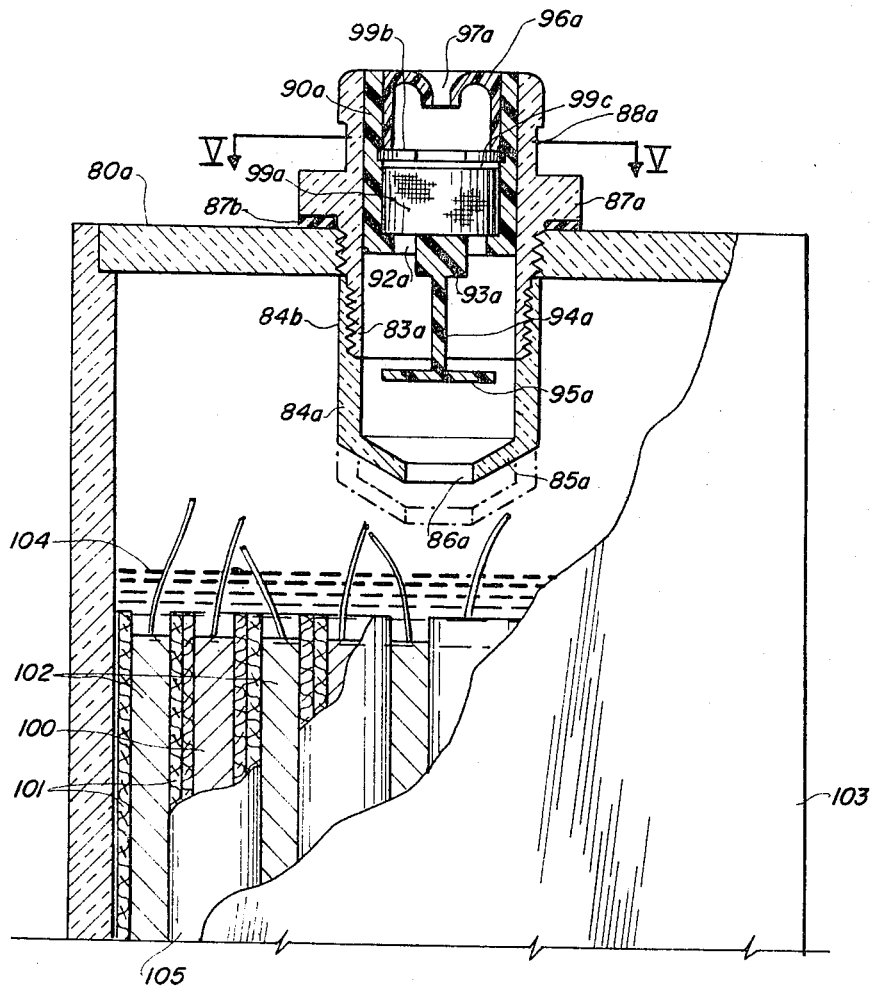
FIG. 4 is a cross-sectional view through a storage cell provided with a further modification of a unidirectional valve.

In FIG. 1 I show a cell casing whose wall portion 10 is provided with a downwardly converging frusto-conical aperture 11 whose periphery forms an annular seat 12 for a ball-shaped valve body 13 urged against this seat by a coil spring 14 resting against the base 15 of a cap 16 removably maintained upon the cylindrical wall of an outwardly extending tubular member 18 coaxial with aperture 11. The peripheral wall portion 17 of this cap 16 frictionally engages the tubular member 18 which is disposed on the low-pressure side of a wall 23 constituting part of the partition means forming the valve. Member 18 is thus provided on the exterior side 19 of casing 10. Cap 16 is formed with a central orifice 20 surrounded by an annular, inwardly projecting ridge 21 around which the spring 14 is seated. Member 18 forms with wall 23 and cap 16 a compartment in which a layer 22 of an organosiloxane or fluorinated grease is disposed upon wall 23. The grease coats both the ball 13 and the valve seat 12 and can, according to the invention, be a high-viscosity silicon grease such as Dow-Corning 44 with a viscosity on the order of $10^6$ centistokes or upwardly thereof. Alternatively, the viscous medium can be a KEL–F 90 or Voltalef 90 grease. A lower tubular member 24 is also coaxial with aperture 11 and projects inwardly beyond the inner surface 25 of wall portion 10 to provide an inlet opening distal therefrom but above the level H—H of the electrolyte. Member 24 terminates in a plane parallel to surface 25 and spaced therefrom sufficiently so that at least a major part of the nonentrapped electrolyte within the cell casing can be accommodated between that plane and surface 25 when the cell casing is inverted.

In normal operation of the cell, the electrodes (for example those shown in FIG. 4) are charged to maximum capacity. Should there be some excessive charging, the electrolyte, which can be an aqueous solution of potassium hydroxide when the cell is of the silver/zinc type, decomposes and evolves a gas into the space 26 above the electrolyte level, this gas entraining therewith particles of the electrolyte and proceeding upwardly through aperture 11 when the pressure within chamber 26 (i.e. within the high-pressure region) is sufficient to overcome the force of spring 14 and the retarding force resulting from the viscosity of greast layer 22. The particles of electrolyte accummulate at the base of the grease layer as the gas bubbles pass through and drop back into the electrolyte mass therebelow, the layer 22 reforming a continuous film blocking the passage between body 13 and valve seat 12 immediately upon reduction of the pressure within chamber 26. Since no electrolyte remains between the body 13 and seat 12, there is no danger that carbonate crystals will maintain the ball 13 in its open condition or that the electrolyte within the cell casing will form a carbonate, the passage being blocked immediately by the grease layer.

The device of FIG. 2 comprises a valve formed in the cell casing 30 of a storage battery or the like. This valve has a dependent tubular member 31 terminating in a frusto-conical end portion 32 provided with an inlet opening 33 for gases to be vented to the atmosphere. A second tubular member 34, likewise integral with the casing 30, has its inner bore coextensive with that of tubular member 31 and a similarly coextensive periphery. Tubular member 34, however, extends upwardly and receives a cylindrical axial projection 35 of a hollow plug 36 forming the transverse wall 37 of a partition means as previously described. Block 36 has a dependent shank 38 coaxial with the interior compartment 39 of tubular members 31 and 34, this shank being surrounded by an annular array of angularly equispaced bores 40 in the wall 37. Shank 38 has a central opening 41 into which is forced the axially extending stud 42 of a relatively soft, preferably synthetic resin (e.g. polyethylene) baffle plate 43 which lies transversely to the axis of chamber 39 intermediate wall 37 and opening 33 but which has a larger diameter than the latter and defines a peripheral clearance 44 with the interior of tubular member 31. Baffle plate 43 serves to accumulate electrolyte entrained upwardly by the gas to free the latter from the liquid and must, therefore, be composed of a material chemically inert to the electrolyte.

A plurality of disk-shaped layers 45 of porous paper impregnated with silicon grease overly wall 37 with its apertures 40 and are held in place by an annular retaining cap 46 whose cylindrical portion is pressed into the plug 36 and is integral with a head 48, the outer surface 49 of which is coplanar with the outer surface of the head 50 of plug 36. This head forms a shoulder 52 which is seated against the upper edge 53 of the tubular member 34. A similar shoulder 54 on cap 46 serves to prevent excessive insertion of the latter which is also formed with a central channel 59 framed by an annular ridge 58 for escape of the gases from the interior of the cap. The lower end 60 of this cap is provided with tooth-like formations 63 bounded by oblique surfaces 61, 62 so that only the apices of the teeth bear upon the periphery of the layers 45 at spaced locations whereby these layers can, intermediate these teeth, be elevated by excessive gas pressure to release it. A further layer 64 of the grease is superimposed upon layers 45 so that these layers simultaneously function as resilient valve bodies covering the apertures 40 with their flaps between the teeth 63 and as apertured members themselves, forming individual valves at their interstices with the air of the grease. The opening 33 again lies in a plane parallel to but spaced from the wall 30 so that the major part of the free electrolyte can be received therebetween when the cell is inverted. The gas, substantially freed from electrolyte upon contact with the baffle plate 43, normally passes through the interstices of the paper disks 45, the grease reforming a film after such passage to block these interstitial apertures in the manner previously described. The bubble of electrolyte (broken line in FIG. 2) collected upon baffle plate 43 returns to the body thereof within the cell when its weight exceeds the retaining force of its surface tension.

In the arrangement of FIG. 3, a plurality of paper disks 99 impregnated with the grease are held in place along the wall 91 of a cup-shaped member 90 by an annular retaining element 96 having a central aperture 97 and teeth 98 in engagement with the disks 99 at spaced locations around their circumference as previously described. The cup-shaped member 90 is received within the upper tubular member 88 of the valve 83 which is threaded at 82 into the cell wall 80, having female thread 81, until the shoulder 87 of valve 83 sealingly engages the casing. The usual array of angularly spaced apertures 92 is provided around a central boss 93 of the cup-shaped member 90 whose shank 94 supports a baffle plate 95 in alignment with the relatively small-diameter aperture 86 at the terminus of a frusto-conical portion 85 of the lower tubular member 84 of the valve. This device functions similarly to that described with reference to FIG. 2 and may be removably positioned in any cell casing, the number of layers 99 being varied with the desired pressure to be maintained within the casing.

Figure 5:
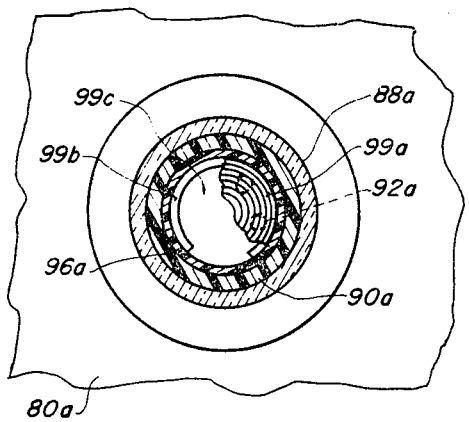
FIG. 5 is a cross-sectional view taken along the line V—V of FIG. 4.

In FIGS. 4 and 5 I show a system generally similar to that of FIG. 3 wherein the cell casing 103 is provided with an upper wall portion 80a in which the valve body is threadedly secured. The cell comprises a plurality of the usual electrode packages 105 each of which contains at least one positive electrode 100 of, say, the silver/silver oxide type, spaced from a negative electrode 102 of the zinc/zinc-oxide type by a cellophanic separator 101 which also serves to wrap the package, the conductive leads of the respective electrodes being joined at common output terminals. The level of the free potassium hydroxide electrolyte is shown at 104 in FIG. 4. As is also apparent from this figure, the lower tubular member 84a is threaded onto the valve 83a at 84b so that the distance of inlet opening 86a, at the base of frusto-conical portion 85a, from the wall of the casing can be adjusted (dash-dot lines) so as to be settable in accordance with the free-electrolyte volume of the cell. Again a baffle plate 95a, whose diameter exceeds that of opening 86a, is aligned with this opening within the lower tubular member and is supported therein by an axial shank 94a integral with the hub 93a of a cup-shaped member 90a having angularly spaced apertures 92a in its bottom wall. The partition means includes a roll 99a of filter paper impregnated with a grease of the afore-described type, upon which is disposed a membrane 99c whose periphery is secured by a C-shaped snap ring 99b so that the remainder of this periphery forms an excess-pressure-release valve as previously described. This ring is received within an annular slot in the interior of the upper tubular member 88a and serves as a stop for the cap 96a whose central aperture 97a permits the escape of gas from the cap. Shoulder 87a of valve 83a engages wall portion 80a via an elastic washer 87b. The membrane 99c forms a flap-type valve similar to that provided by the layers 45 and 99 (FIGS. 2 and 3) while the roll 99a of impregnated paper constitutes the interstitial type of valve previously discussed with reference to these layers.

According to a further aspect of this invention it may be noted that, especially in silver-zinc cells operating with potassium hydroxide electrolyte, active or nascent hydrogen is present at the negative electrode when oxygen is evolved at the positive electrode. Interestingly enough, it has been found that incomplete discharge of the negative active material permits a recombination of oxygen from the positive electrode with residual hydrogen at the negative electrode within the body of electrolyte. Advantageously, therefore, the negative electrodes 102 are provided with an excess of the negative active material above the electrochemical equivalent of the active material on the positive electrode 100. The cell can thus be charged indefinitely at a relatively low level (e.g. on the order of milliamperes in alkaline electrolytes), thereby effecting the reformation of water as rapidly as it decomposes to eliminate net gaseous evolution, the excess charging energy being derived as thermal energy in the heat evolved by the synthesis of water upon recombination of hydrogen and oxygen.

The invention described and illustrated is believed to admit of many modifications within the ability of persons skilled in the art, all such modifications being considered within the spirit and scope of the appended claims.

I claim:

1. In a storage cell, in combination:
a cell casing forming a liquid-tight enclosure;
a pair of rechargeable spaced electrodes of opposite polarity;
an electrolyte in contact with said electrodes, and
a valve mounted in said casing for the unidirectional passage of gas evolved upon charging of said electrodes between a high-pressure region within said cell casing and a low-pressure region exteriorly thereof comprising
a tubular member projecting inwardly into said casing and having an inlet opening communicating with the interior thereof;
a second tubular member extending outwardly from said casing and having an outlet opening communicating with the atmosphere;
partition means having at least one aperture therein interposed between said tubular members wherein said partition means includes a wall provided with said aperture and forming a valve seat around said aperture, said valve further comprising a valve body displaceable into and out of engagement with said seat along a surface of said wall on the low-pressure side thereof, and resilient means urging said body into engagement with said seat, said body being convex in the direction of said seat and said resilient means being a spring bearing upon said body; and
a layer of a viscous high-vacuum grease selected from the group consisting of fluorine-containing and silicon-containing greases disposed along said partition on the side exposed to said outlet opening at least partly surrounding said body and normally blocking said aperture.

2. In a storage cell, in combination:
a cell casing forming a liquid-tight enclosure;
a pair of rechargeable spaced electrodes of opposite polarity;
an electrolyte in contact with said electrodes,
and a valve mounted in said casing for the unidirectional passage of gas evolved upon charging of said electrodes between a high pressure region within said cell casing and a low-pressure region exteriorly thereof comprising
a tubular member projecting inwardly into said casing and having an inlet opening communicating with the interior thereof;
a second tubular member extending outwardly from said casing and having an outlet opening communicating with the atmosphere;
partition means having at least one aperture therein interposed between said tubular members wherein said partition means includes a wall provided with said aperture and forming a valve seat around said aperture, said valve further comprising a valve body constituted of a displaceable flap of a resilient membrane overlying said aperture partition means;
said flap being displaceable into and out of engagement with said seat along a surface of said wall on the low-pressure side thereof, resilient means urging said body into engagement with said seat; and a layer of viscous high-vacuum grease selected from the group consisting of fluorine-containing and silicon-containing greases disposed along said partition on the side exposed to said outlet opening at least partly surrounding said body and normally blocking said aperture.

3. In a storage cell, in combination:
a cell casing forming a liquid-tight enclosure;
a pair of rechargeable spaced electrodes of opposite polarity;
an electrolyte in contact with said electrodes,
and a valve mounted in said casing for the unidirectional passage of gas evolved upon charging of said electrodes between a high pressure region within said cell casing and a low-pressure region exteriorly thereof comprising
a tubular member projecting inwardly into said casing and having an inlet opening communicating with the interior thereof;
a second tubular member extending outwardly from said casing and having an outlet opening communicating with the atmosphere;
partition means having at least one aperture therein interposed between said tubular members wherein said partition means includes a wall provided with said aperture and forming a valve seat around said aperture, said valve further comprising a valve body;
said partition means including at least one layer of a gas-permeable fibrous sheet material impregnated with said grease.

4. The combination defined in claim 3 wherein said valve is formed with said second tubular member extending transversely to said partition means on the low-pressure side thereof and enclosing said layer of sheet material, further comprising an annular element received in said second member and engaging said layer for retaining it against said partition means.

5. The combination defined in claim 4 wherein said annular element engages said layer along only a portion of the periphery thereof, whereby said layer is deflectible along the remainder of its periphery to pass said gas.

6. The combination defined in claim 4 wherein said layer of sheet material is composed of porous paper.

7. The combination defined in claim 6 wherein said layer of sheet material is in the form of a coil of said paper.

References Cited

UNITED STATES PATENTS

| | | | |
|---|---|---|---|
| 3,172,782 | 3/1965 | Jache | 136—6 |
| 2,451,087 | 10/1948 | Hindall | 136—165 |
| 2,571,754 | 10/1951 | Perkins | 136—165 |
| 2,757,223 | 7/1956 | Duncan | 136—178 |
| 2,770,666 | 11/1956 | Knight | 136—178 |

FOREIGN PATENTS

| | | |
|---|---|---|
| 166,186 | 7/1921 | Great Britain. |
| 613,344 | 11/1948 | Great Britain. |

ALLEN B. CURTIS, *Primary Examiner.*

D. L. WALTON, *Assistant Examiner.*